United States Patent
Hoehn et al.

(10) Patent No.: US 10,746,009 B2
(45) Date of Patent: Aug. 18, 2020

(54) DEPTH-BASED BOREHOLE TRAJECTORY CONTROL

(71) Applicants: Oliver Hoehn, Hannover (DE); Michael Neubert, Braunschweig (DE); Andreas Peter, Celle (DE); Ingolf Wassermann, Hannover (DE); Bilel Said, Celle (DE)

(72) Inventors: Oliver Hoehn, Hannover (DE); Michael Neubert, Braunschweig (DE); Andreas Peter, Celle (DE); Ingolf Wassermann, Hannover (DE); Bilel Said, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 85 days.

(21) Appl. No.: 15/171,193

(22) Filed: Jun. 2, 2016

(65) Prior Publication Data

US 2017/0350229 A1 Dec. 7, 2017

(51) Int. Cl.
| | | |
|---|---|---|
| *E21B 44/00* | (2006.01) | |
| *E21B 44/02* | (2006.01) | |
| *E21B 7/06* | (2006.01) | |
| *E21B 7/04* | (2006.01) | |
| *E21B 47/024* | (2006.01) | |

(Continued)

(52) U.S. Cl.
CPC ............ *E21B 44/00* (2013.01); *E21B 7/04* (2013.01); *E21B 7/06* (2013.01); *E21B 44/02* (2013.01); *E21B 47/024* (2013.01); *E21B 47/12* (2013.01); *G05B 15/02* (2013.01); *E21B 7/068* (2013.01);

(Continued)

(58) Field of Classification Search
CPC .................................. E21B 44/00; E21B 7/04
See application file for complete search history.

(56) References Cited

U.S. PATENT DOCUMENTS

| | | | | |
|---|---|---|---|---|
| 6,470,974 B1 * | 10/2002 | Moore | ...................... | E21B 4/18 |
| | | | | 166/255.2 |
| 2005/0269082 A1 * | 12/2005 | Baron | ...................... | E21B 7/04 |
| | | | | 166/255.2 |

(Continued)

FOREIGN PATENT DOCUMENTS

| | | |
|---|---|---|
| EP | 2559846 A2 | 2/2013 |
| WO | 2016054586 A1 | 4/2016 |

OTHER PUBLICATIONS

Neubert, et al. "Advanced Trajectory Simulation of Directional Wellbores", Conference: Energy week '97 conference & exhibition, Houston, TX, 1997; pp. 45-52.

(Continued)

*Primary Examiner* — David J Bagnell
*Assistant Examiner* — Dany E Akakpo
(74) *Attorney, Agent, or Firm* — Cantor Colburn LLP

(57) ABSTRACT

Methods and apparatuses for controlling a trajectory of a borehole being drilled into the earth are provided. The apparatus includes a drilling system including a drill tubular, a disintegrating device, and a steering system coupled to the drill tubular configured to steer the drilling system, the drilling system configured to drill the borehole by receiving control outputs from at least one control unit for controlling parameters of the drilling system, the at least one control unit configured to provide the control outputs to the steering system, the at least one control unit being configured to provide depth-based control.

18 Claims, 6 Drawing Sheets

(51) Int. Cl.
  *E21B 47/12* (2012.01)
  *G05B 15/02* (2006.01)
  *E21B 21/08* (2006.01)
  *E21B 49/00* (2006.01)
  *E21B 49/08* (2006.01)
  *G01B 21/18* (2006.01)

(52) U.S. Cl.
  CPC ............ *E21B 21/08* (2013.01); *E21B 49/003* (2013.01); *E21B 49/08* (2013.01); *G01B 21/18* (2013.01)

(56) References Cited

U.S. PATENT DOCUMENTS

| | | | |
|---|---|---|---|
| 2009/0050370 A1 | 2/2009 | Peters | |
| 2010/0187008 A1 | 7/2010 | Wassermann et al. | |
| 2012/0018219 A1* | 1/2012 | Runia | E21B 7/04 175/26 |
| 2012/0080235 A1* | 4/2012 | Sheppard | E21B 7/06 175/61 |
| 2013/0341091 A1 | 12/2013 | Sugiura | |
| 2015/0275646 A1 | 10/2015 | Benson et al. | |
| 2015/0330209 A1 | 11/2015 | Panchal et al. | |
| 2016/0024847 A1 | 1/2016 | Benson et al. | |
| 2016/0032705 A1 | 2/2016 | Benson et al. | |
| 2016/0123080 A1 | 5/2016 | Herbig et al. | |

OTHER PUBLICATIONS

English Translation of "M. Neubert, Zur Entstehung spiralförmiger Bohrlöcher; Bericht Jan. 1993; Institut für Technische Mechanik, TU Braunschweig", 3 pages.

International Search Report, International Application No. PCT/US2017/031854, dated Aug. 16, 2017, Korean Intellectual Property Office; International Search Report 3 pages.

International Written Opinion, International Application No. PCT/US2017/031854, dated Aug. 16, 2017, Korean Intellectual Property Office; International Written Opinion 9 pages.

Neubert, M. "Zur Entstehung spiralförmiger Bohrlöcher", Bericht Jan. 1993; Institut für Technische Mechanik, TU Braunschweig; 33 pgs.

European Search Report for European Application No. 17807191.6, International Filing Date May 10, 2017, dated Nov. 22, 2019, 8 pages.

* cited by examiner

DEPTH-BASED BOREHOLE TRAJECTORY CONTROL

BACKGROUND

Boreholes are drilled into the earth for many purposes such as hydrocarbon production, geothermal production, and carbon dioxide sequestration. Many of these boreholes need to have a precise location and geometry in order to increase efficiency for its desired purpose. Steam assisted gravity drainage is one example of a specific horizontal geometry for efficient hydrocarbon production. The geometry generally includes, for example, depth or drilled distance, inclination, build-up rate, and azimuth. The location may relate to a distance to a geologic formation boundary and/or a distance to an adjacent borehole. Hence, development of drilling control systems to increase the accuracy and precision of drilling boreholes would be well received in the drilling industry.

BRIEF SUMMARY

Methods and apparatuses for controlling a trajectory of a borehole being drilled into the earth are provided. The apparatus includes a drilling system comprising a drill tubular, a disintegrating device, and a steering system coupled to the drill tubular configured to steer the drilling system, the drilling system configured to drill the borehole by receiving control outputs for controlling parameters of the drilling system and at least one control unit configured to provide the control outputs to the steering system, the at least one control unit being configured to provide depth-based control.

BRIEF DESCRIPTION OF THE DRAWINGS

The following descriptions should not be considered limiting in any way. With reference to the accompanying drawings, like elements are numbered alike.

DETAILED DESCRIPTION

A description of one or more embodiments of the disclosed apparatuses and methods are presented herein by way of illustration and example and are not intended to be limitations. Reference will be made to the appended to the figures.

Disclosed are apparatus and method for drilling a borehole into the earth. The method, which is implemented by the apparatus described herein or other controller, computer, and/or processor, provides a control approach that can be used to control a borehole trajectory that may be characterized, for example, by depth, drilled distance, inclination, azimuth, build-up-rate, distance to a formation boundary, distance to an object such as another borehole, a geologic object, a downhole installation, or any other borehole trajectory related parameter. As used herein, the term "depth" may be considered to be inclusive of data indicative of depth, such as "drilled distance" (also known as "measured depth"), true vertical depth, true stratigraphical depth in order to account for deviated or horizontal boreholes, or any other depth related data including depth data that is corrected for depth measurement influencing effects such as stretching/squeezing because of gravity effects, temperature effects, pressure difference effects, etc.

Figure 1A:
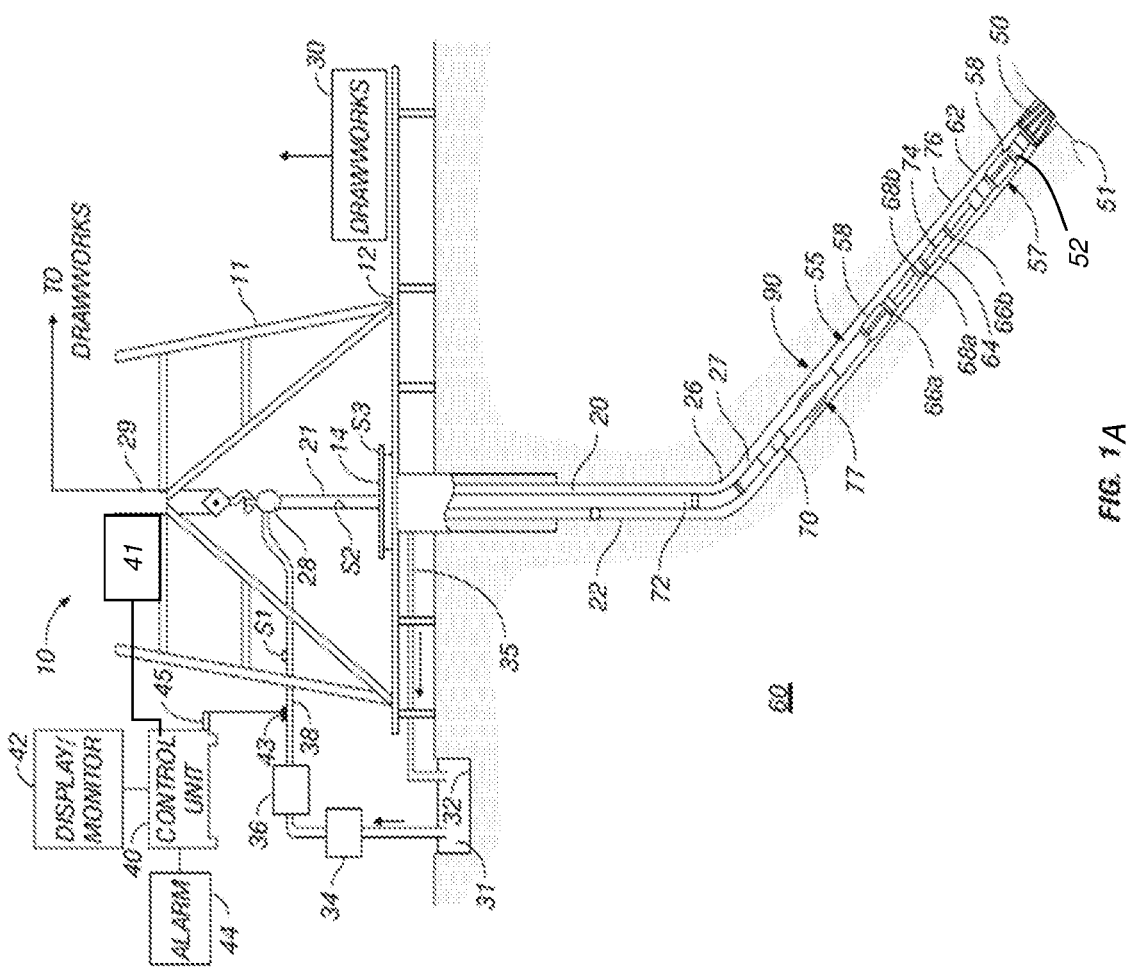
FIG. 1A depicts aspects of a drilling system for drilling a borehole into the earth.

Apparatus for drilling operations related to this disclosure are now discussed. FIG. 1A shows a schematic diagram of a drilling system 10 that includes a drill string 20 having a drilling assembly 90, that may include a bottom hole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegrating device 50 (e.g., a drill bit), attached to the end of the drilling assembly 90, disintegrates the geological formations to drill the borehole 26. Various types of disintegrating devices can be used. While the present disclosure is made with reference to rotary drilling utilizing a rotary drill bit, other drilling types such as electric pulse drilling, jet drilling, and/or percussion drilling may be utilized as well. The drill string 20 is coupled to a drawworks 30 via a kelly joint 21, swivel 28 and line 29, e.g., through a pulley and/or pulley system. During the drilling operations, the drawworks 30 is operated to control the weight on bit, which affects the rate of penetration (ROP). The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger and fluid control valve 36, fluid line 38, and the kelly joint 21. The drilling fluid 31 is discharged at the borehole bottom 51 through an opening in the disintegrating device 50. The drilling fluid 31 circulates uphole through the annular space 27 between the drill string 20 and the borehole 26 and returns to the mud pit 32 via a return line 35. A sensor S1 in the line 38 provides information about the fluid flow rate. The flow rate can be controlled by a valve located in or near the pump 34 and/or the desurger and fluid control valve 36, or otherwise located within line 38. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the wellbore 26. The system may further include one or more downhole sensors 70 located on the drill string 20 and/or the drilling assembly 90. The downhole sensors 70 can include one or more sensors configured to sense, measure, and/or detect, for example, a position, orientation, inclination, and/or azimuth of the sensor(s) and/or the BHA or other downhole component. Some or additional sensors may be configured to detect and/or measure formation properties and/or mud properties.

In some applications the disintegrating device 50 is rotated by only rotating the drill pipe 22. However, in other applications, a drilling motor 55 (mud motor) disposed in the drilling assembly 90 is used to rotate the disintegrating device 50 and/or to superimpose or supplement the rotation of the drill string 20. In either case, the rate of penetration (ROP) of the disintegrating device 50 into the borehole 26 for a given formation and a drilling assembly largely depends upon the weight on bit and the disintegrating device rotational speed. In one aspect of the embodiment of FIG. 1A, the mud motor 55 is coupled to the disintegrating device 50 via a drive shaft (not shown) disposed in a bearing assembly 57. The mud motor 55 rotates the disintegrating device 50 when the drilling fluid 31 passes through the mud motor 55 under pressure. The bearing assembly 57 supports the radial and axial forces of the disintegrating device 50, the downthrust of the drilling motor and the reactive upward loading from the applied weight on bit. One or more stabilizers 58 coupled to the bearing assembly 57 and other suitable locations act as centralizers for the lowermost portion of the mud motor assembly and other such suitable locations.

A surface control unit 40 receives signals from the downhole sensors 70 and devices, for instance, via a sensor 43 placed in the fluid line 38 (in case of a mud pulse telemetry) or elsewhere for other types of telemetry such as wired pipe telemetry, acoustic telemetry, or electromagnetic telemetry, as well as from sensors S1, S2, S3, hook load sensors and any other sensors used in the system and processes such signals according to programmed instructions provided to the surface control unit 40. The surface control unit may process hook position data, hook load data, and/or other data such as weight on bit to determine, derive, or correct drilled distance, ROP, etc. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

The drilling assembly 90 also contains other sensors and devices or tools for providing a variety of measurements relating to the formation surrounding the borehole and for drilling the wellbore 26 along a desired path. Such devices may include a device for measuring the formation resistivity near and/or in front of the disintegrating device 50, a gamma ray device for measuring the formation gamma ray intensity and devices for determining rotation speed (rpm), inclination, azimuth, ROP, and/or position of the drill string. A formation resistivity tool 64, made according an embodiment described herein may be coupled at any suitable location, including above a lower kick-off subassembly 62, for estimating or determining the resistivity of the formation near or in front of the disintegrating device 50 or at other suitable locations. An inclinometer 74 and a gamma ray device 76 may be suitably placed for respectively determining the inclination of the drilling assembly 90 and/or BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the disintegrating device 50 via a hollow shaft that also enables the drilling fluid to pass from the mud motor 55 to the disintegrating device 50. In an alternative embodiment of the drill string 20, the mud motor 55 may be coupled below the resistivity measuring device 64 or at any other suitable place.

Still referring to FIG. 1A, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices (also known as downlink). In one aspect, a mud pulse telemetry system may be used to communicate data between the downhole sensors 70 and devices and the surface equipment during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication between the surface and the drilling assembly 90, including but not limited to, an acoustic telemetry system, an electromagnetic telemetry system, a wired pipe, or combinations thereof. Repeaters may be used in conjunction with the telemetry system. The wired pipe may be made up by joining drill pipe sections, wherein each pipe section includes a data communication link that runs along the pipe. The data connection between the pipe sections may be made by any suitable method, including but not limited to, hard electrical or optical connections, induction, capacitive or resonant coupling methods. In case a coiled-tubing is used as the drill pipe 22, the data communication link may be run along a side of the coiled-tubing.

The drilling system described thus far relates to those drilling systems that utilize a drill pipe to convey the drilling assembly 90 into the borehole 26, wherein the weight on bit is controlled from the surface, typically by controlling the operation of the drawworks. However, a large number of the current drilling systems, especially for drilling highly deviated and horizontal wellbores, utilize coiled-tubing for conveying the drilling assembly downhole. In such application a thruster is sometimes deployed in the drill string to provide the desired force on the disintegrating device. Also, when coiled-tubing is utilized, the tubing is not rotated by a rotary table but instead it is injected into the wellbore by a suitable injector while the downhole motor, such as mud motor 55, rotates the disintegrating device 50. For offshore drilling, an offshore rig or a vessel is used to support the drilling equipment, including the drill string.

Still referring to FIG. 1A, a resistivity tool 64 may be provided that includes, for example, a plurality of antennas including, for example, transmitters 66a or 66b or and receivers 68a or 68b. Resistivity can be one formation property that is of interest in making drilling decisions. Those of skill in the art will appreciate that other formation property tools can be employed with or in place of the resistivity tool 64.

As noted above, the drilling fluid 31 is pumped by a drilling fluid pump 34 and a flow rate of the drilling fluid is controlled by a desurger and drilling fluid control valve 36. The drilling fluid pump 34 and flow control valve 36 are controlled by a drilling parameter controller 41 and/or the surface control unit 40 to maintain a suitable pressure and flow rate to prevent the borehole 26 from collapsing. The term "drilling fluid" is intended to be inclusive of all types of drilling fluids known in the art including, but not limited to, oil-based mud, water-based mud, foam, gas, and air. The drilling parameter controller 41 is configured to control, such as by feedback control for example, parameters of drilling equipment used to drill the borehole 26.

One or more surface sensors (e.g., S1, S2, S3, 43) or downhole sensors 70 (within drilling assembly 90 and/or along drill string 20) may be used to provide feedback signals to the drilling parameter controller 41 for feedback control of drilling equipment. Non-limiting embodiments of drilling parameters include weight-on-bit, hook load, torque, drill bit rotational speed (e.g., rpm), rate-of-penetration (ROP), steering forces, depth, hook position, drill bit position, drilling direction, azimuth, inclination, tool face of the drilling assembly, pressure, mud flow rate, and formation evaluation measurements as described below. Control references, also known as set points, which may include set points related to a trajectory plan, can be transmitted to the drilling parameter controller 41 by the control unit 40 (e.g., a computer processing system).

In an alternative configuration, the drilling parameter controller 41 may utilize, include, comprise, or be part of the control unit 40. The drilling parameter controller 41 can be, in some embodiments, installed downhole, for instance in drilling assembly 90. The drilling parameter controller 41 can include one or more controlling elements (not shown) configured to deal with various components, features, and/or variables of the controlling aspects and which can be installed downhole or on surface or both. One or more stabilizers (not shown) may be disposed at various locations on the drill tubular, for instance at one or more distances $L_1$ (i=1, 2, 3 . . . ) from the disintegrating device 50.

As noted, the drilling assembly 90 and/or drill string 20 includes one or more downhole sensors 70 configured for sensing one or more downhole properties or parameters related to the earth formation 60, the borehole 20, the drilling fluid 31, the drill string 20, the drilling assembly 90, etc. Parameters associated with the drilling assembly 90 that may be sensed and/or monitored can include, position of the drilling assembly 90, orientation of the drilling assembly 90, inclination of the drilling assembly 90, tool face of the drilling assembly 90, and/or azimuth of the drilling assembly 90. Sensor data can be transmitted to the surface by the telemetry system 72 for processing by the control unit 40.

Data acquisition by the downhole sensor(s) 70 while drilling the borehole 26 may be referred to as measurement-while-drilling (MWD) or logging-while-drilling (LWD). Sensed data can be correlated to a depth or a time at which the data was obtained to provide a depth-based or a time-based log. One example for a downhole sensor 70 is a formation evaluation sensor which can be a sensor configured to sense gamma-ray radiation. The gamma-ray radiation may be natural or may result from neutron bombardment of the formation, such as by a pulsed neutron generator, a radioactive source, or any other suitable neutron source known in the art. In other embodiments or in combination therewith, the downhole sensor(s) 70 can include sensors configured to sense resistivity, neutron radiation, acoustic energy, electromagnetic energy, electric energy, magnetic energy, nuclear magnetic resonance properties, chemical properties, formation porosity, formation density, formation permeability, fluid density, fluid viscosity, temperature, pressure, magnetic fields, force, acceleration, and/or gravity. The downhole sensor(s) 70 can comprise active or passive sensing elements. The downhole sensors 70 can operate as a part of a sensor system (e.g., as part of drilling assembly 90) comprising transmitting and receiving elements. The downhole sensor(s) 70 may provide sensed measurements or data that is measured system output to the drilling parameter controller 41 for feedback control purposes.

The drilling assembly 90, as shown, includes a steering system 52. The steering system 52 is configured to steer the disintegrating device 50 in order to control orientation of the drilling assembly 90 in order to allow drilling the borehole 26 according to a selected path or geometry (for instance, by following a planned geometric path or by keeping a distance to an object). The steering system 52 can control, for example, inclination, azimuth, and/or tool face of the drilling assembly 90. Further, the steering system 52 controls the drilling assembly 90 and/or the disintegrating device 50 to follow a planned geometric path or by controlling the drilling assembly 90 and/or BHA and drill string 20 to keep a desired distance to or from an object in the earth formation 60.

For steering the drilling assembly 90 or disintegrating device 50, the steering system 52 includes one or more actuators that are configured to convert a controller output from the drilling parameter controller 41 into a motion that can alter the path being drilled by the disintegrating device 50. For example in a rotary steering system (RSS), an actuator can be a piston that moves a pad for providing a force exerted against a borehole wall thus steering the drilling assembly 90 and the disintegrating device 50. In an alternative embodiment, steering the drilling assembly 90 can be controlled using bent downhole motors (not shown) where behavior can be changed by controlling the motor bent through rotating or non-rotating (i.e., sliding) the drill string 20. Bent drilling motors can be used with a fixed bend that cannot be varied during normal operation or with a variable bend that, for example, can be varied based on a controller output of the drilling parameter controller 41. In embodiments with a variable bend, actuators can be included in the bent downhole motor that are configured to create or vary the bend, thereby affecting the steering behavior of the steering system.

Accordingly, the term "steering system" is to be construed as including those components both downhole and/or at the surface (e.g., rotary table 14 and/or drilling fluid pump 34) that operate in order to control a trajectory or orientation of the drill string 20 and/or the disintegrating device 50 for drilling the borehole 26. It can be appreciated that the output of the control unit 40 and/or the drilling parameter controller 41 can be generated within the steering system 52 and does not necessarily need to be received from a source external to the steering system 52. Accordingly, the term "controller output" is to be construed as including controller outputs that are received from a source external to the steering system 52 and/or generated internal to the steering system 52.

In order to provide controller outputs (for example, a control signal or a system input) to the steering system 51 for controlling the trajectory or orientation of the disintegrating device 50, the drilling parameter controller 41 is configured to implement a trajectory control algorithm, discussed below. Operation of the trajectory control algorithm employs a processor such as in the control unit 40, the drilling parameter controller 41, and/or other processing system.

In various embodiments, the drilling parameter controller 41 can be disposed downhole, at the surface, and/or functions can be split between a surface processor and a downhole processor. Steering commands or other controller outputs can be transmitted from the drilling parameter controller 41 to the steering system 51 by telemetry. In addition, other information of interest (e.g., rate-of-penetration or position, depth, drilled distance, orientation, and/or other sensor measurements) can be transmitted using telemetry. Telemetry in one or more embodiments may include mud pulse telemetry, acoustic telemetry, electromagnetic telemetry, telemetry by rpm variations, and/or wired pipe telemetry. Downhole electronics 11 may process data downhole and/or act as an interface with the telemetry. In other embodiments, the downhole electronics within the drilling assembly 90 can be configured to implement the trajectory control algorithm or portions thereof. In such embodiments, the control unit 40 can transmit a desired trajectory (i.e., trajectory plan) or parts of the trajectory if that is all that is needed, to the drilling assembly 90, steering system 51, and/or drilling parameter controller 41. In some embodiments, if the trajectory is described as a parameterized curve, only the parameters can be transmitted. In non-limiting embodiments, the trajectory can be in absolute coordinates (such as north-east-down) or the trajectory can be depth sequence for the orientation (such as inclination, azimuth, tool face), or a distance to an object.

For controlling a system, for instance the drilling system 10 to create a borehole trajectory, a mathematical description of the drilling system 10 can be utilized to estimate a potential system output in response to a system input that may comprise a control output. As a non-limiting example, a mathematical description can be one or more system equations. As used herein, the term "system equation" includes a set of system equations comprising more than one single equation. Those of skill in the art will appreciate that there are many types of system equations, and the present disclosure is not limited to any particular system equation and/or set of system equations. A non-limiting example are system equations that are differential equations of the order n. Typical conventional dynamic systems, known for example from technical processes, can be described with a first order differential equation with respect to time t:

$$\frac{dy(t)}{dt} = f(y(t), u(t), t) \qquad \text{Eq. (1)}$$

where y(t) denotes a system output, $f(y(t),u(t),t)$ is a function describing the system behavior and u(t) is the system input that causes the system output (bold type denoting a vector). The system equation can also be stated in discrete time-based notation for implementation into and solution by a digital processor:

$$\frac{(y(k+1) - y(k))}{T_s} = g(y(k), u(k), k) \qquad \text{Eq. (2)}$$

with a discretization time interval $T_s$ and time $tk = k\, T_s$, $k=1, 2, 3, \ldots$. The discretization time interval $T_s$ can be a fixed value or may be variable. The length or the boundaries of the discretization time interval $T_s$ can be predefined. Those skill in the art will appreciated that there are other methods of implementation into a digital processor known in the art, including, but not limited to, a finite element method that may be utilized accordingly.

Both of the above system equations (Eqs. (1)-(2)) describe a rate of change with respect to time. An example is a velocity response of a car when stepping on an accelerator pedal. Because the time response to a given input is known for these systems, discrete time-based control algorithms can be designed and parameterized using standard methods as known in the art. However, there are other systems for which the reaction to a control output cannot be described by a unique function with respect to time. For example, in the drilling system 10, the system output (that is, the response or the reaction) of the drilling system 10 in response to a steering force applied by an actuator and/or pad of the drilling assembly 90 to a borehole wall depends significantly on a rate of penetration (ROP) of the drilling system 10. For instance, if the ROP of disintegrating device 50 is zero during a particular time interval $\Delta t$, that is if the drilling assembly 90 does not move in an axial direction along the borehole 26 during the time interval $\Delta t$, a steering force applied to the borehole wall by a pad of the drilling assembly 90 will not cause any change in the drilling direction. However, in contrast, if the ROP of the drilling system 10 is relatively high, the effect of that same steering force might lead to a significant change of the drilling direction during the time interval $\Delta t$.

As explained above, the output of the drilling system 10 in response to a steering control output is a function of spatial position rather than a function of time. Accordingly, the reference for the path or geometry of the borehole 26 being drilled or planned (also known as a "well plan") describes the path or geometry with respect to its spatial position and/or orientation. The spatial position and/or orientation can be described with respect to depth or drilled distance, rather than with respect to time.

As described above, a process for controlling a drilling process can be implemented using the control unit 40 and/or the drilling parameter controller 41. FIGS. 1B and 3-9 show schematic illustrations of control systems in accordance with the present disclosure. FIGS. 1B and 3-9 can be read and described in representing a physical implementation of a control system. Alternatively, FIGS. 1B and 3-9 and their associated description can be understood as a framework of modeling packages to simulate the output of the physical implementations of a control system and/or parts of a control system. The simulations by these modeling packages can then be used to adjust a parameter set of a corresponding physical implementation of the control system and related (e.g., discrete) control algorithms.

Figure 1B:
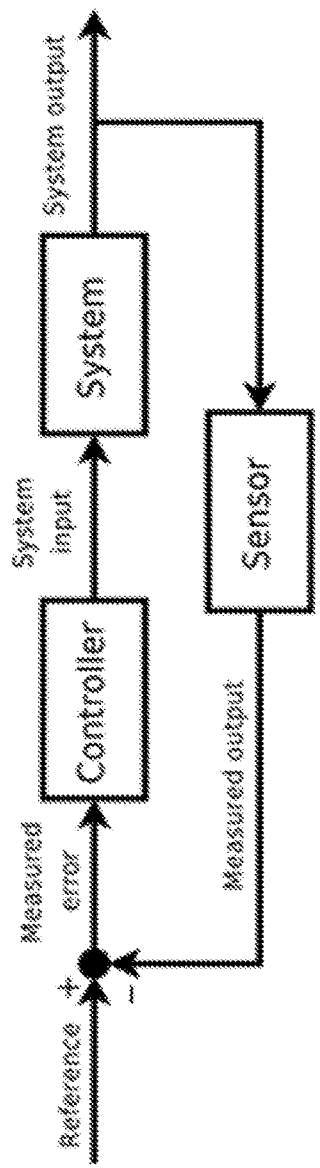
FIG. 1B depicts a schematic illustration of a control process that may be employed by embodiments of the present disclosure.

FIG. 1B shows an example schematic illustration of a process that can be implemented on one of the control unit 40 and/or the drilling parameter controller 41. As shown, a reference value also referred to as a target value is input at the left side of FIG. 1B. This reference value can be compared to a measured output obtained from sensors (e.g., sensors S1, S2, S3, 43, 70) resulting in a measured error that is input into the control device (e.g., the control unit 40 and/or the drilling parameter controller 41). The control device (e.g., 40, 41) generates a system input that is provided to the system (e.g., drilling system 10) which is then output as a drilling operation. The system in turn can comprise further control loops, such as shown and discussed herein. During the drilling operation, sensors (e.g., sensors S1, S2, S3, 43, 70) can monitor aspects of the drilling system 10 and thus generate a measured output that is provided in a feedback loop to the controller (e.g., 40, 41), and thus the system input and system output can be actively adjusted based on the measured features monitored by the sensors (e.g., sensors S1, S2, S3, 43, 70) to provide an accurate and efficient drilling operation.

Figure 2:
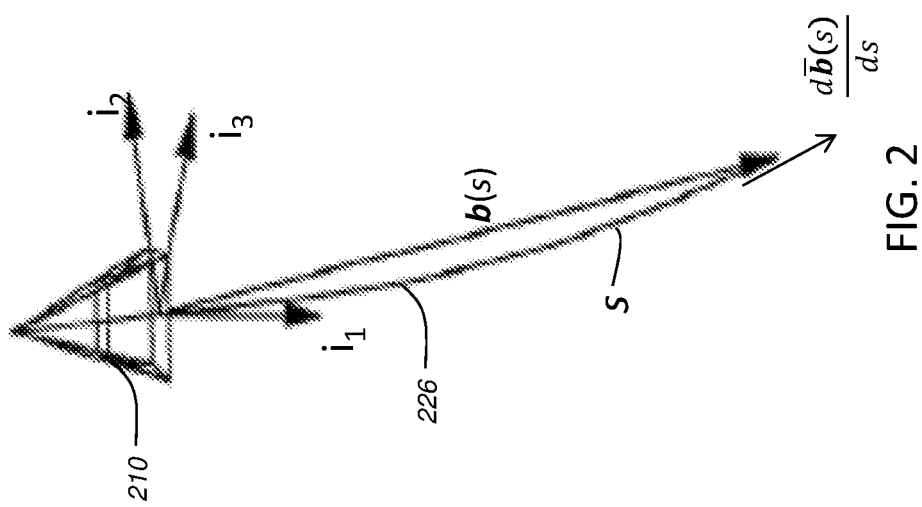
FIG. 2 depicts aspects of a trajectory vector for representing a trajectory of the borehole being drilled.

Turning now to FIG. 2, an example of the geometry of a well plan is schematically shown. The geometry of the borehole 226 is described by the vector b(s) where s denotes the drilled distance (also known as measured depth) along the trajectory as illustrated in FIG. 2 (where $i_1$, $i_2$, and $i_3$ are three orthogonal directions). As a non-limiting example, a system equation that describes the vector b(s) may be a differential equation of the order n. For example, if n=1, the differential equation db(s)/ds describing the borehole geometry vector b(s) may be stated as follows:

$$\frac{db(s)}{ds} = F(b(s), b(s-L_1), \ldots, b(s-L_N), u(s)) \quad \text{Eq. (3)}$$

where F( ) is a function describing the output of the drilling system 210 (which may be substantially similar to drilling system 10 of FIG. 1A) in response to a control output, i.e., the variation of the vector b in dependence of the drilled distance. u(s) is a system input (e.g., the steering forces applied by a steering system) that may comprise a control output and db(s)/ds is the tangent vector of the trajectory, e.g., at the disintegrating device (e.g., drill bit) describing the drilling direction.

It can be seen that in this case the system equation (Eq. (3)) is time independent. The system equation Eq. 3 depends only on a drilled distance s along the trajectory. Downhole sensors 70 and/or surface sensors S1, S2, S3, 43 can be configured to monitor parameters indicative of the drilling direction db(s)/ds such as, but not limited to, inclination, inclination rate (also known as buildup rate), azimuth, azimuth rate, dogleg severity, depth, drilled distance, ROP, distance to an object, or any combination of these. One or more of the sensed parameters indicative of db(s)/ds may be compared with a reference (also known as set point) that may be part of a well plan. Such comparison can be made to determine a measurement error (cf. FIG. 1B) to adjust the control output of the drilling parameter controller based on the depth-based system equation (e.g., feedback loop shown in FIG. 1B). Such measurements and comparisons can be made to minimize the measurement error as a drilled distance increases. When, for example, a specific steering force is applied by the steering system of the drilling system 210, an inclination response is a function of depth or drilled distance rather than a function of time. The differential equation (Eq. (3)) describing the current drilling direction is a delay differential equation because the drilling direction is also influenced by the position of stabilizers (not shown) on the BHA and drill string. The distances from the disintegrating device to the stabilizers are denoted with $L_1 \ldots L_N$ in Eq. (3).

The discretized system equation corresponding to the delay differential equation for implementation into and solution by a digital processor can be stated as follows:

$$\frac{(b(k+1) - b(k))}{D_s} = G\left(b(k), b\left(k - \frac{L_1}{D_s}\right), \ldots, b\left(k - \frac{L_N}{D_s}\right), u(k), k\right) \quad \text{Eq. (4)}$$

with drilled distance $s_k = kD_s$, k=1, 2, 3, . . . and discretization drilled distance interval $D_s$. The discretization drilled distance interval $D_s$ can be a fixed value or can be variable. The length or the boundaries of the discretization drilled distance interval $D_s$, in some embodiments, can be predefined. In one or more embodiments, the selected drilled distance interval $D_s$ can be decreased in areas or volumes of interest in a formation to provide a more accurate trajectory. Those of skill in the art will appreciate that there may be other methods of implementation into a digital processor, such as a finite element method.

It can be appreciated that discrete depth-based control is one non-limiting embodiment of what may be described generally as "depth-based control." In another non-limiting embodiment, depth-based control may include continuous depth-based control where depth or drilled distance is continuous or not discretized. Common drilling parameter controllers (e.g., 41 in FIG. 1A) are configured to employ discrete time-based control algorithms that calculate new controller outputs every sampling time interval. The sampling time interval can be identical to or different from a discretization time interval. Contrary to drilling parameter controllers utilizing a discrete time-based system equation, drilling parameter controllers utilizing a discrete depth-based system equation calculate new controller outputs every sampling drilled distance interval, at predetermined drilled distances, or at predetermined drilled distance intervals. The sampling drilled distance interval can be identical to or different from the discrete drilled distance interval. The predetermined drilled distances or drilled distance intervals at which the drilling parameter controller utilizing a discrete depth-based system equation to calculate new controller outputs might be identical to or different from the predetermined drilled distances or drilled distance intervals used to define the discretization drilled distance interval $D_s$.

Those of skill in the art will appreciate that the depth-based system equation (Eq. (3)) could be transformed into a time-based system equation. A depth-to-time transformation can be accomplished using the following relationship:

$$ds = \text{ROP} dt \text{ and } s = \int \text{ROP} dt \quad \text{Eq. (5)}$$

where ROP is rate-of-penetration of the disintegrating device into the earth. From the transformation of Eq. (5), it is seen that if ROP is known and constant over time, s and t are proportional and the time-based system equation (Eq. (5)) can be transferred into a depth-based system equation (Eq. (3)) and vice versa. In drilling systems, however, ROP is usually highly variable and cannot be predicted because it depends on many unknown factors such as the geology being drilled through and human input from a drilling operator on the surface.

For this reason, the system equation of the drilling system with respect to drilled distance (Eq. (3)) can be well known. However, the system equation of the drilling system with respect to time (Eq. (5)) may lack necessary information regarding the time dependency of ROP and is therefore unknown or known only within a relatively broad range reflecting the range of ROP that the drilling system might experience. Accordingly, the lack of information of the time dependency of the ROP can lead to relatively high inaccuracies when predicting the output of the drilling system in response to a control output of the drilling parameter controller. Consequently, by utilizing a time-based system equation (e.g., Eq. (5)), the relatively high inaccuracy of the system equation can lead to improperly calculated controller outputs which in turn can lead to overshoots or undershoots of the output of the drilling system that is to be controlled. Repeated improper calculated controller outputs can lead to oscillations of the drilling system that are highly undesired. For example, such oscillations can cause lower overall ROP, deviations from a well plan, higher wear, and generally higher cost. Oscillating well trajectories can also impede the installation of downhole equipment after the borehole is drilled, including, but not limited to, casings, liners, production equipment, etc.

When setting up or designing a time-based control of a drilling system by a drilling parameter controller, in view of the unknown and/or variable ROP, it is possible to make assumptions with respect to the ROP of the drilling system during operation. For instance, one possible assumption is that the ROP will be constant during the operation and set up the controlling parameter accordingly. In that case, the system equation is accurate and valid for only one particular (assumed) ROP. Thus, a time-based control algorithm based on a system equation is only optimal for a particular (assumed) ROP. Drilling with higher or lower ROP can result in an unstable system or in a suboptimal control performance using control systems utilizing time-based system equations.

For example, if several layers of different types of rock are being drilled, the ROP can vary due to the different characteristics of the different types of rock. In this type of situation, the control may become unstable creating unwanted oscillations of the controlled system and/or deviations from the planned well trajectory. On the other hand, depth-based control in this type of situation is not dependent on ROP and can provide for stable drilling conditions. Describing the drilling system behavior as a unique function of depth or drilled distance allows common design methods for conventional control systems (e.g., Nyquist, Hurwitz criteria, Root-locus-plot, etc.) allowing much more accurate control results than if applied to a time-based system equation.

The technical effect of the unknown ROP on a system which is controlled based on a time-based system equation could be mitigated to some extent (although not eliminated), if the ROP could be measured instantaneously and the control output could be adjusted based on the measured ROP. However, measuring the downhole ROP of drilling systems can be difficult due to a high variability with respect to time, as noted above. In addition, the ROP of drilling systems is also not constant with respect to drilled distance. In particular, the ROP measured on surface might significantly differ from the ROP measured downhole. Such differences can arise from stretching or squeezing effects, temperature effects, pressure differences, and other factors. If telemetry is involved, the instantaneous determination of ROP can be impeded as the telemetry from downhole to surface and vice versa can be too slow for many telemetry systems such as mud pulse telemetry, acoustic telemetry, electromagnetic telemetry, etc. Further, such telemetry systems can be limited by amounts of data transferred (e.g., in the range of only tens of bits per second) and/or can be expensive.

Figure 3:
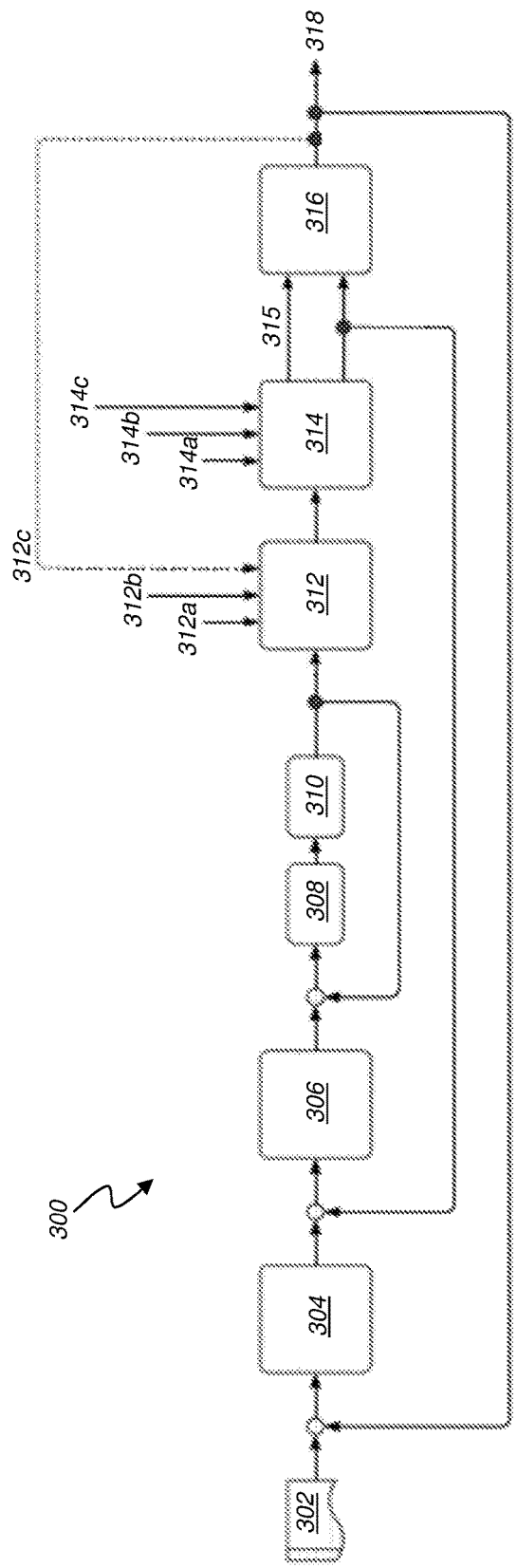
FIG. 3 depicts aspects of one embodiment of controller implementation for controlling drilling parameters.

Referring now to FIG. 3, a schematic block diagram of a non-limiting embodiment of a depth-based control system is shown. The depth-based control system 300 of FIG. 3 implements a well plan 302 which can be input into a computer or other control device. Various aspects of the depth-based control system 300 can be implemented, for example, in one or both of the control unit 40 and/or the drilling parameter controller 41 of FIG. 1A. For example, a trajectory control unit 304 that can be part of a drilling parameter controller 41 is configured to provide controller outputs (e.g. control signals) to a BHA in a borehole in accordance with the well plan 302. The well plan 302 can include information about the planned borehole as a function of drilled distance. The trajectory control unit 304 provides control outputs to an inclination/azimuth control unit 306 for inclination/azimuth control of the inclination and/or azimuth of the borehole being drilled.

The inclination/azimuth control unit 306 can receive inclination and/or azimuth feedback from components of a BHA that is performing a drilling operation. The inclination/azimuth control unit 306 outputs to an actuator control unit 308 (which can be at the surface or downhole) for control of actuators 310 that are located downhole, e.g., as part of a BHA. The actuators 310 are configured to operate on one or more aspects of a BHA 312, for controlling drilling operations. The BHA 312, in some embodiments, may include a steering system (e.g., steering system 52 of FIG. 1A). The actuator control unit 308 can receive feedback control to ensure a desired position of the actuator 310 is achieved. In some embodiments, a surface top-drive can be used to control the orientation of a mud-motor and thus the trajectory for drilling the borehole, with similar control operations and components configured for such application. In some embodiments, the BHA 312 or other parts of the depth-based control system 300 can receive disturbances that may be difficult or impossible to control including and/or related but not limited to BHA design 312a, torque-on-bit, weight-on-bit 312b, and/or information related to a prior instance well path 312c.

The design and operational parameters of the BHA 312 determine the forces at the bit and bit orientation. Accordingly, the design and operational parameters of the BHA 312 may have an effect on the bit-formation interaction 314 that in turn may affect the output of the system such as one or more of the ROP and the drilling direction (i.e., inclination and azimuth). In addition, the bit-formation interaction 314 may be affected by disturbances that are difficult or impossible to control during drilling such as, but not limited to, bit properties 314a, formation properties 314b, and/or drilling constraints 314c (e.g., weight-on-bit, torque-on-bit, RPM, flow rate, mud, etc.). Changes in ROP 315 and/or the drilling direction will be added together or integrated over a particular depth interval, which is represented by box 316 in FIG. 3B. Adding together or integration of changes in ROP 315 and/or drilling direction will then lead to an altered position of a disintegrating device (e.g., drill bit; disintegrating device 50 at borehole end 51 in FIG. 1A). The altered position of the disintegrating device is then part of the system output 318 of the depth-based control system 300 that is in accordance with the well plan 302.

The depth-based control system 300 is configured to execute a depth-based control algorithm by utilizing a depth-based system equation, as described above. The depth-based control algorithm, in some embodiments, can be executed every sampling drilled distance interval. That is, controller outputs are updated every time a sampling drilled distance interval is achieved using a depth-based system equation. The trajectory control unit 304 receives to this end information about the drilled distance, measured depth, or other depth-related data such as true vertical depth or true stratigraphical depth. This information may be received from a feedback loop as illustrated in FIG. 3 or form a separate data source (not shown in FIG. 3) as further discussed and described below. In one or more embodiments, the selected sampling drilled distance interval is approximately one-half meter or one meter.

Non-limiting embodiments of a depth-based control algorithms implemented by the depth-based control system 300 include proportional control, proportional-integral control, and proportional-integral-derivative control. The depth-based control algorithms are configured to reduce measurement error (cf. FIG. 1B) measured by feedback over drilled distance by adjusting of a control variable that can be changed by movement of an actuator, for example. In one or more embodiments, multiple sub-controllers, such as the trajectory control unit 304 and/or the inclination/azimuth control unit 306 can be incorporated into one controller that performs the functions of the multiple sub-controllers.

Those of skill in the art will appreciate that other control designs (e.g. state space control) can be employed without departing from the scope of the present disclosure. Furthermore, the approach for depth-based control algorithms is independent of the type of the steering system (e.g., point-the-bit, push-the-bit, rotary steering system, bent motor, etc.).

Control systems that employ depth-based control algorithms as provided herein can include, for example, trajectory control systems (e.g., controlling a position of a well with respect to a given well plan) or direction control systems (e.g., controlling inclination or azimuth). There are different depth-based control algorithms that can be used (e.g., PID Control, Model Predictive Control, fuzzy control, etc.) and/or different control architectures that can be used (e.g., direct control architecture, subsidiary control architecture, etc.).

In direct control architectures, the output of a trajectory control unit is a target value for a steering unit actuator (e.g., the target forces for steering ribs or pads). In subsidiary control architectures (or secondary control architectures) an outer control loop for a trajectory control unit and an inner loop for a direction (inclination, azimuth) control unit are used. Additional, inner control loops are possible, e.g., a force control for steering pads. The output of an outer control loop can be a target value for the inner loop. For example, outputs of trajectory control unit 304 can be target inclination and target azimuth. The outputs of the inclination/azimuth control unit 306 are target forces where for example the output of the force controller may be target motor currents. In one or more embodiments, if subsidiary control with a depth-based trajectory control as an outer control loop is used, then the inner control loops may not necessarily need to be depth-based controls. For example, the inner control loop algorithms can be time-based. As such, a mix of depth-based and time-based controls and algorithms can be employed for the inner control loops.

Figure 4:
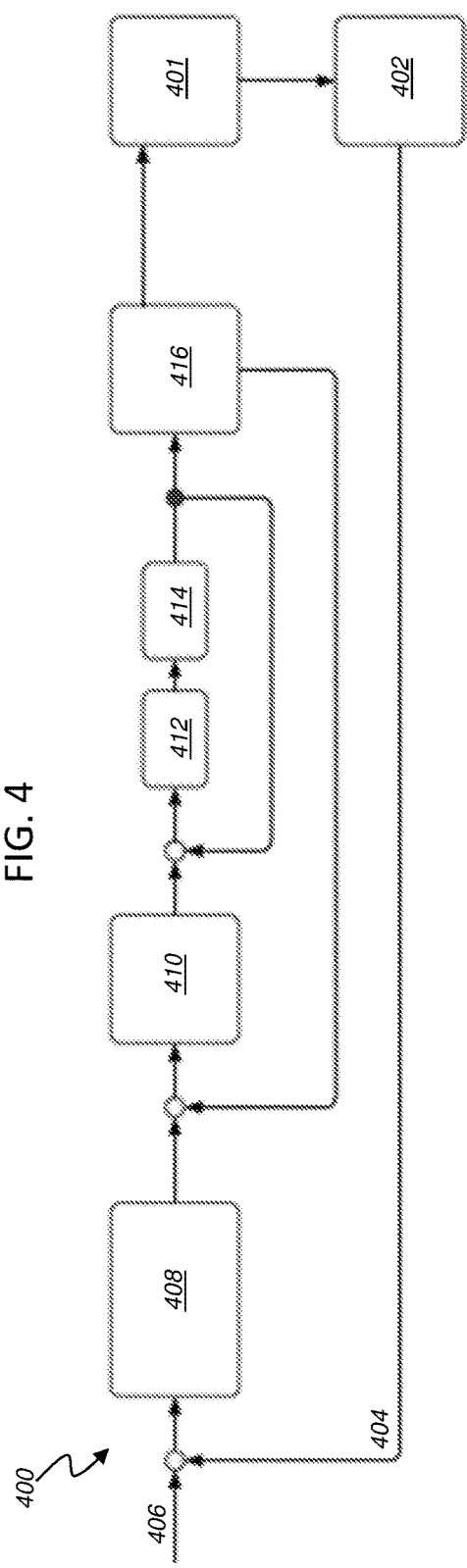
FIG. 4 depicts aspects of one embodiment of controller implementation using a formation evaluation sensor.

Referring now to FIG. 4, a block diagram of a non-limiting embodiment of a controller implementation using a formation evaluation sensor is illustrated. Control system 400 can include a flow process for controlling a drilling operation. The control system 400 includes a sensor 402. The sensor 402 can be a formation sensor configured to detect or measure one or more characteristics of a formation 401. In some non-limiting embodiments, the sensor 402 is a measurement-while-drilling (MWD) sensor such as a gamma sensor.

The sensor 402 provides a sensor signal 404 output that may be compared with a target value that may be part of and/or derived from a well plan 406 (e.g., the sensor signal 404 input to a comparison with a target value of the well plan to adjust the input of an inclination/azimuth control unit 410 described below). The target value of the well plan 406 and the sensor signal 404 from sensor 402 can be based on various formation characteristics, such as gamma-ray readings. In such a configuration, a formation characteristic control unit 408 can receive the target value or other input from the well plan 406 and the sensor signal 404. As such, when the sensor 402 is a gamma-ray sensor, the sensor signal 404 represents a gamma-ray count rate. The formation characteristic control unit 408 can be configured to control the distance from a downhole feature (e.g., cap-rock) that emits gamma-rays. The automatic control can be achieved by controlling the direction of the borehole being drilled so that gamma-ray counts are at a constant value. To maintain a constant gamma-ray count, the formation characteristic control unit 408 can output control signals to an inclination/azimuth control unit 410 and/or an actuator control unit 412 that controls an actuator 414. Accordingly, a drilling assembly 416 within the formation 401 can be controlled based on a formation characteristic and directional drilling in accordance with a well plan can be maintained.

Those of skill in the art will appreciate that other types of sensors can be used without departing from the scope of the present disclosure. For example, the sensor 402 of FIG. 4 can be an acoustic sensor, a magnetostatic sensor, an electromagnetic sensor, and/or other type of downhole sensor. Further, in some embodiments, multiple sensors of the same type or different types can be used to provide information and feedback for controlling drilling operations.

The well plan 406 of FIG. 4 may comprise one or more target values that are selected for the measurement being performed by the sensor 402 (e.g., target gamma-ray count value, slope, noise level, etc.). As noted above, multiple sensors can be employed in various embodiments of the present disclosure and the multiple sensors can be configured to measure different properties or parameters of the formation and/or BHA. For example, the sensor 402 can be configured to measure resistivity of a formation. As another example, a BHA can have a sensor for measuring gamma-rays and another sensor for measuring resistivity. In such configuration, the gamma-ray measurements can provide a distance to cap-rock while the resistivity measurement provides a distance to an oil-water contact. In some embodiments, the output of more than one sensor can be combined to a single control variable that may be used as a control variable in the formation characteristic control unit 408.

Figure 5:
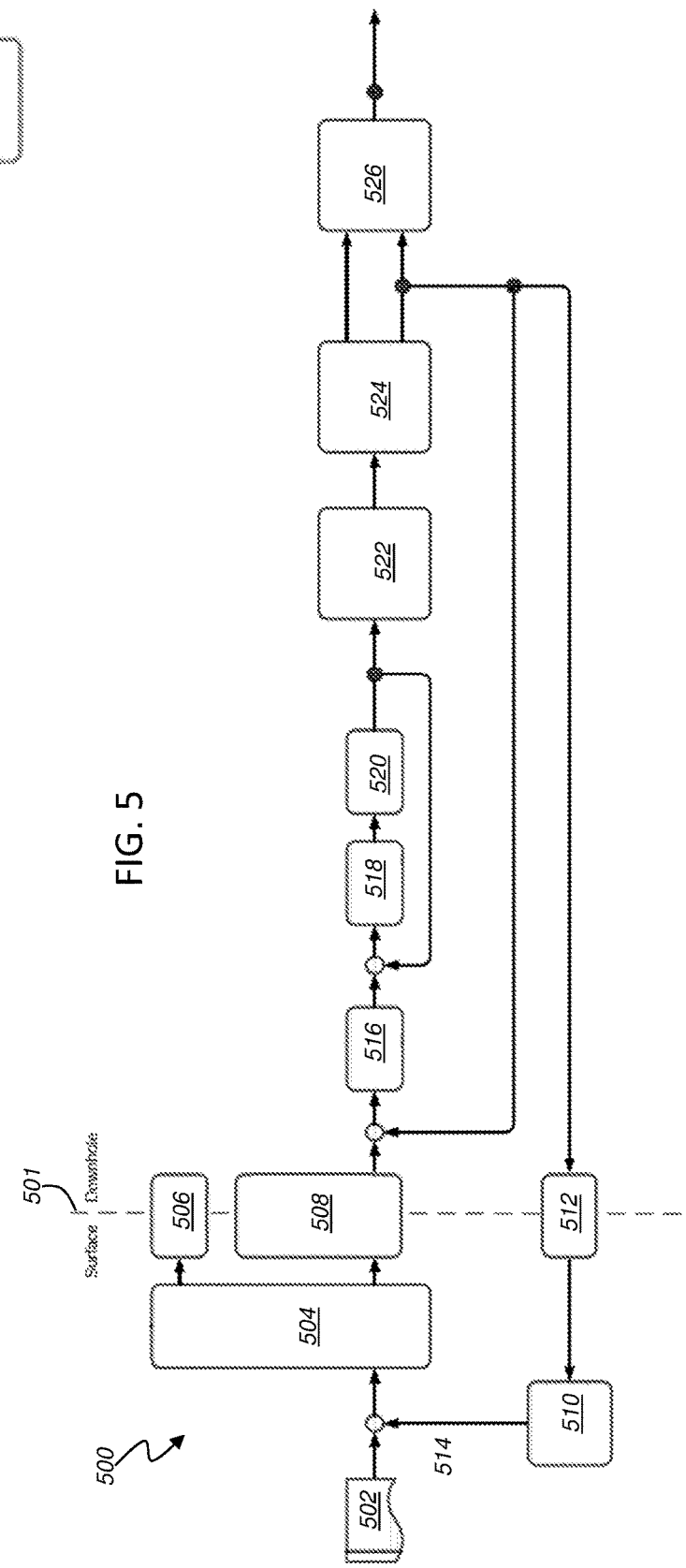
FIG. 5 depicts aspects of one embodiment of controller implementation providing drilling trajectory control.

Referring now to FIG. 5, a block diagram of a non-limiting embodiment of a control system 500 employing a depth-based drilling trajectory control implementation on surface is illustrated. The embodiment shown in FIG. 5 is a distributed depth-based control system 500, i.e., a portion of the control system 500 is located on the surface, indicated as to the left of the vertical dashed line 501, and a portion of the control system 500 is located downhole, indicated as to the right of the vertical dashed line 501. A well plan 502 can be input into a surface control unit 504 (e.g., similar to control unit 40 of FIG. 1A). The surface control unit 504 can be utilized to automatically, semi-automatically, or manually vary parameters of the drilling system via a rig control unit 506 and also be in communication with downhole components (e.g., the BHA and components thereof) through a downlink system 508. The surface control unit 504 can receive surface or downhole information and/or data at a data processor 510. Surface or downhole information or data may include depth of a reference location on the drilling assembly. Downhole data or information may be provided through telemetry 512 and/or other data communication means or mechanism. The data processor 510 can generate input data 514 by processing the downhole information and/or surface information (e.g., mud, ROP, survey information, depth, drilling direction, vibration, rpm, weight-on-bit, torque-on-bit). Information and/or data may comprise measured information and/or data or simulated information and/or data, etc. The input data 514 can be used to determine deviations or measurement errors from reference values (cf. FIG. 1B) that may be part of the well plan 502.

The control output or measurement error (e.g., control signals from the surface control unit 504) can be used to control downhole components including, but not limited to, an inclination/azimuth control unit 516 and/or an actuator control unit 518 that controls one or more actuators 520. Controlling the control units 516, 518 may include modifying control modes and/or parameterization of control algorithms implemented in the control unit 516 and/or control unit 518. Further, the control output from the surface control unit 504 can be used to influence and/or control a BHA 522, a bit-formation interaction 524, and/or the adding or integration 526 over a particular depth interval (similar to that described above with respect to FIG. 3). Further, similar feedback loops described and shown above can be utilized in the control system 500. The control system 500 can implement changes at the surface (e.g., advice change to plan, advice to ream, advice to change bit and/or BHA design, etc.). Additionally, additional information and actions can be translated or transmitted from the surface, including, but not limited to, surface control of weight-on-bit, RPM, flow rates, mud properties, etc. that can be implemented through the rig control unit 506. Similarly, the downlink 508 can be used to send control updates and/or changes to downhole components, including the BHA (e.g., changing active bit features, changes in control mode, controller, and/or parameterization, etc.).

An advantage of implementation of the distributed depth-based control system, as shown in FIG. 5, is that all information required for depth-based trajectory control is available at the surface on conventional drilling systems or can be easily derived (e.g., reference trajectory, information about current position such as from a survey, depth, drilled distance, etc.). Furthermore, depth-based control on surface can make easier use of surface actuation (e.g., weight-on-bit, rotational speed, mud flow rate, etc.) in order to influence a drilling trajectory or change constraints such as, but not limited to, disturbances 312*a*, 312*b*, 312*c*, or drilling constraints 314*c*.

In the embodiment of FIG. 5, the surface control unit 504 can receive drilling direction information from downhole components. For example, the drilling direction information can be obtained from the BHA 522 or other downhole components via telemetry 512 and/or from surface information such as survey information. In addition, the surface control unit 504 can receive the well plan 502. Using this information, the surface control unit 504 can provide control outputs, drilling constraints, or disturbances (such as 312*a*, 312*b*, 312*c* in FIG. 3) downhole via the downlink 508 and surface control signals to surface drilling equipment (e.g. rig control unit 506) for controlling weight-on-bit, rotational speed, mud flow rate, mud properties, etc. The signals sent downhole can be configured to switch the BHA into a different operational mode, change downhole control algorithms, change control parameterization, etc. The signals sent downhole may also be configured to activate or influence active BHA devices (e.g., active bit, reamer, additional stabilizers, and/or other mechanical properties of the BHA which could be actuated) via downlink 508. The surface control unit 504 may also be configured to provide advice to a user when a parameter does not meet or exceed a threshold value or, alternatively, exceeds a threshold value depending on the parameter. For example, if the ROP does not meet a selected value, the surface control unit 504 can issue a suggestion to change the disintegrating device or to change the BHA. Other advice may include a suggestion to change a drilling plan, to ream the borehole, or to change a previous borehole path. Alternatively, an automatic or semi-automatic ROP optimization process can be applied.

Figure 6:
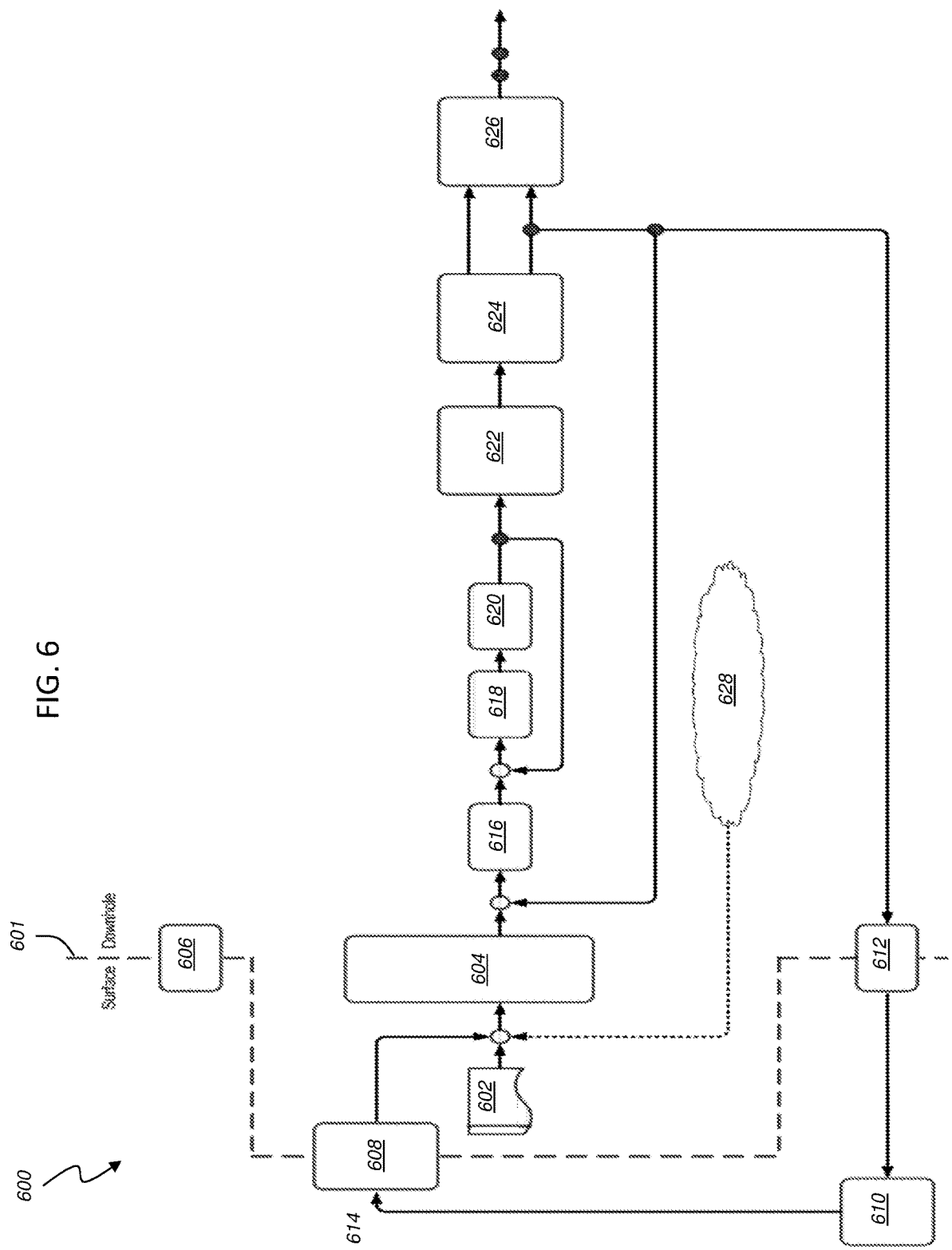
FIG. 6 depicts aspects of one embodiment of controller implementation providing downhole control.

Referring now to FIG. 6, a block diagram of a non-limiting embodiment of a control system 600 employing a depth-based control implementation downhole is illustrated. The embodiment in FIG. 6 is a distributed depth-based control system, i.e., a portion of the control system 600 is located on the surface, indicated as to the left of the vertical dashed line 601, and a portion of the control system 600 is located downhole, indicated as to the right of the vertical dashed line 601. The control system 600 includes a well plan 602 and a downhole control unit 604 (e.g., downhole electronics and/or a combination with surface and downhole electronics). The control system 600 further includes a rig control unit 606 and communication is enabled with downhole components (e.g., a BHA and components thereof) through a downlink system 608. A data processor 610 located on the surface can receive information and/or data through telemetry 612 and/or other data communication means or mechanism. In particular, the data processor 610 can receive depth information or depth related information such as number and length of drilling tubulars and hook position. Such information allows the system to calculate drilled distance that is required to apply the depth-based control algorithm described above. The data processor 610 can generate further input data 614 by processing downhole information and/or surface information (e.g., mud properties, flow rate, ROP, survey information, drilling states, etc.). The input data can be measured data, simulated data, or both. The input data 614 can be used to update and/or otherwise modify the well plan 602.

The downhole control unit 604 can be used to control downhole components including, but not limited to, an inclination/azimuth control unit 616 and/or an actuator control unit 618 that controls one or more actuators 620 in the BHA 622. Further, the control signals from the downhole control unit 604 can be used to influence and/or control other parts of the BHA 622, the bit-formation interaction 624, and/or the adding/integration 626 over a particular depth interval (similar to that described above with respect to FIG. 3). Further, similar feedback loops described and shown above can be utilized in the control system 600. The control system 600 can implement changes at the surface (e.g., advice change to plan, advice to ream, advice to change bit and/or BHA design, etc. via data processor 610 or downlink system 608). Additionally, additional information and actions can be translated or transmitted to the surface, including, but not limited to, surface control of weight-on-bit, RPM, flow rates, mud properties, etc. that can be implemented through the rig control unit 606. Similarly, the downlink system 608 can be used to send control updates and/or changes to downhole components, including the BHA (e.g., changing active bit features, changes in control mode, controller scheme, and/or parameterization of the control system, etc.).

Depth-based downhole trajectory control as enabled in control system 600 employs information about ROP or a depth or drilled distance increment. These values are typically measured on surface in conventional rigs and can be transmitted downhole from the surface via downlink system 608, telemetry 612 using wired drill pipe, mud pulse telemetry, acoustic telemetry, electromagnetic telemetry, rpm variations, etc. In some application, however, it may be possible to measure depth, drilled distance, or ROP downhole and convey such information directly or via data processor(s) to the control units 604. Sensors and/or algorithms to determine depth and position related information such as drilled distance or drilling orientation are represented by element 628 in FIG. 6. Information (e.g., change in rotational speed, mud flow rate, etc.) can be transmitted downhole every drilled depth increment (e.g., every drilled meter). In some embodiments, the rotational speed (rpm) or mud flow rate can be changed every drilled depth increment. With this concept, information can be sent to the downhole tool (e.g., BHA 622, etc.) that a depth increment has been drilled. In some embodiments, for example when using an autodriller in constant ROP mode, the ROP typically stays constant over a long period of time and may be downlinked through downlink system 608 to the downhole control unit 604. The downhole control unit 604, in some embodiments, can be configured to evaluate a latest received ROP and switch control parameterizations as needed.

In embodiments such as shown with control system 600 in FIG. 6, surface control does not necessarily need to be a classic control loop. The control system 600 can include surface control aspects that automate some or all trajectory drilling related tasks (e.g., taking surveys, sending downlinks, changing rig set points, etc.). Some control loops which require downhole measurements (e.g., inclination-, azimuth-, or actuator-control) may be easier to implement downhole. For this reason, the control system 600, in some embodiments, can be a distributed control system in which some control functions are performed at the surface and other control functions are performed downhole, as shown in FIG. 6. Further, control features such as reference variable splines, discussed below, allow distribution of trajectory control while minimizing a number of downlinks.

Figure 7:
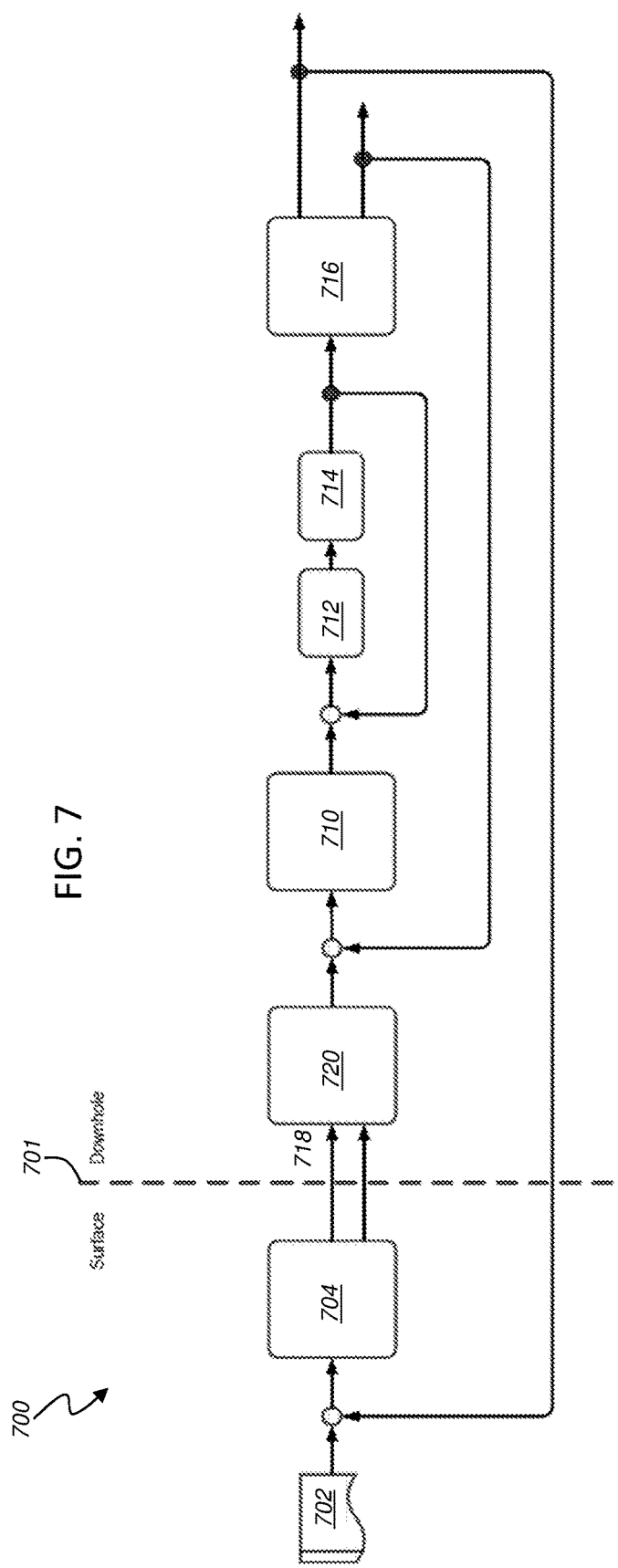
FIG. 7 depicts aspects of one embodiment of controller implementation using a fixed reference value.

Referring to FIG. 7, a block diagram of a control system 700 embodiment of a surface controller 704 implementation using one or more reference values (e.g., target inclination) is illustrated. A well plan 702 can be input to the surface control unit 704 which can output control output to be transmitted to various downhole components (e.g., BHA). The surface and downhole components are separated in FIG. 7 by vertical dashed line 701. The downhole components can include, but are not limited to, an inclination/azimuth control unit 710, an actuator control unit 712 that controls an actuator 714, and/or a drilling assembly 716. Those of skill in the art will appreciate that additional and/or other components and/or various feedback loops and/or other inputs can be employed without departing from the scope of the present disclosure.

In this non-limiting embodiment, information 718, like a set of polynomial parameters, can be output from the surface control unit 704 and sent to a target value generator 720 (e.g., target values for a spline, a ramp, or any other parameterized curve). The target value generator 720 is used to generate target values employed as reference input for the control system 700 to have a depth or drilled distance-dependent reference value. System outputs are then referenced against the depth or drilled distance-dependent target or reference value (e.g., to minimize the difference between a controlled parameter and the target value). Advantageously, embodiments such as control system 700 enable, for example, features such as soft landing, complex well paths with a minimum number of downlinks, etc.

For example, as enabled by control system 700, only the parameters of a reference trajectory need to be downlinked. That is, as shown in FIG. 7, the surface control unit 704 can provide a parameterized curve, the parameter of which included information 718, to the target value generator 720. The target value generator 720 can thus provide one or more reference values to one or more of the various units downhole (e.g., units 710, 712, 716, etc.).

Figure 8:
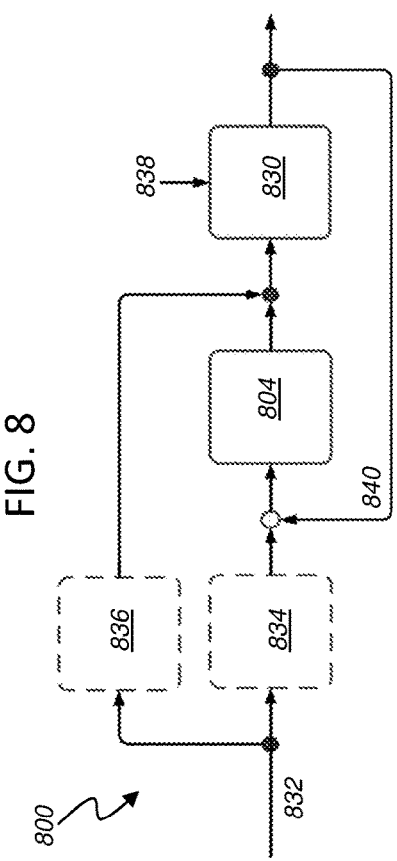
FIG. 8 depicts aspects of pre-control and pre-filter using a known target trajectory.

In one or more embodiments, because a target-trajectory can be known in advance, a pre-control or pre-filter can be used as illustrated in FIG. 8. The control system 800 is a subpart of a control system similar to those described above, and thus various features are omitted for simplicity. In control system 800 a control unit 804 (on surface or downhole) can provide control signals to one or more downhole tools and/or devices 830 (which may include a BHA including a steering unit, and/or other units as described herein or as known in the art). The control unit 804 can receive target values 832 as input, with the target values 832 being passed through a pre-filter 834 and/or a pre-control unit 836. As shown, the downhole tools and/or devices 830 can be subject to disturbances 838, as discussed above, and further can make measurements 840 which can be looped back into the control system 800 through a feedback loop.

Such a filter configuration (e.g., pre-filter 834) can add a degree of freedom and allows optimization of a disturbance transfer function and a reference transfer function independently. The disturbance transfer function describes how the control system 800 reacts on disturbances 838. For example, how long it takes until a control error (deviation from well plan) is eliminated. In a room heating example, a disturbance is opening of a window. The disturbance transfer function describes how fast a temperature controller for the room can adjust the heater to compensate for the open window. The reference transfer function describes how the control system 800 reacts if the target values 832 are changed. That is, how long it takes to get to the new set-point. In the room heating example, if a user changes a desired room temperature from 18° C. to 20° C., the reference transfer function describes how long it takes until the room temperature is 20° C. This also allows anticipating changes in a reference trajectory which could be advantageous for features like soft-landing.

Further, a discrete depth-based control system can simplify the design of the pre-control unit 836. Pre-control unit 836 can be based on knowledge or analysis of the control system 800. For example, if it is known that it requires 50% force to achieve a build-up rate of 10°/100 ft, then the pre-control unit 836 can directly apply that force when it is desired to have a build-up rate of 10°/100 ft. The control unit 804 now only needs to compensate for control errors. The pre-filter 834 can provide for changing control variables such as to provide faster reaction to changes in target values 832. For example, in the room heating example, suppose it is desired to increase room temperature from 18° C. to 20°

C. This is a step of 2° C. which would, for example, require the heater to increase power by 100 W. In order to speed up the heating, a pre-filter could be used which changes the 2° step to a target temperature of 30° C. for 30 minutes and then to 20° C. Accordingly, the heater could increase power by 500 W for the first 30 minutes and then 100 W for the rest of the time. Accordingly, as will be appreciated by those of skill in the art, the pre-filter 834 and pre-control unit 836 can provide improvement to an overall control system, as provided herein.

Figure 9:
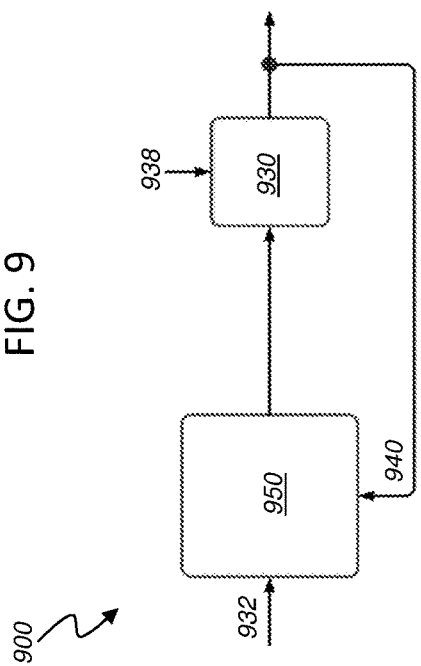
FIG. 9 depicts aspects of model predictive control using a drill-ahead model of the drilling system.

In one or more embodiments, discrete depth-based control may use a model predictive control unit as illustrated in FIG. 9. A model predictive control unit 950 solves an optimization problem every discretization drilled distance interval (i.e., every selected drilled distance interval). The optimization may be based on a drill-ahead model that includes target values 932 of a control system 900 to predict how downhole tools and/or devices 930 may react on input parameter changes. The optimization problem may also consider costs for downlinks, the optimal time when to send a downlink, which actuator to use for influencing a desired trajectory, etc. Furthermore switching between several optimization objectives (e.g., drill as fast as possible, drill with minimum wear, control hold distance to formation layer, etc.) may be implemented. Because the optimization is dependent on a model, some adaptation mechanisms may be used. For example, downhole measurements 940 may be used to update model parameters within the model predictive control unit 950, as shown.

Another potential effect which has a significant influence on the trajectory control of a steering unit and/or BHA can be a time lag or time delay of sensor signals. Because directional and formation evaluation sensors are traditionally mounted several meters behind the disintegrating device, the information about changes in the drilled trajectory is measured with a delay relative to the actual change. That is, downhole sensors can only sense a change once they have reached the change, and thus the disintegrating device has moved further into the trajectory. The time difference of the time when the disintegrating device reaches a change and the time a downhole sensor sense the change is highly dependent on ROP which is usually not constant and not predictable as it depends on many factors, some of which are difficult or impossible to control. This can result in a suboptimal control performance and can lead to an unstable control resulting in borehole undulations. When using a discrete depth-based control algorithm, as provided herein, a depth-delay between disintegrating device and sensor is constant and can be compensated quite easily through a constant delay element for the trajectory plan before comparison with the actual position. The offset-compensation may also be based on a drill tubular model and/or may use additional sensor information (e.g., derived from bending moment sensors in the BHA).

Exceptions to discrete depth-based control may be handled by procedures. There are several drilling situations where an automated trajectory control system is presumably not working (e.g., reaming, drilling on a stringer, etc.). These situations may be detected and covered by electronic procedures which advise (or automatically apply) optimal setpoints for the current situation.

An appropriate control approach for a current situation may be selected by automatically switching between different control approaches, control parameterizations, and/or other control concepts (e.g., electronic procedures). Electronic procedures may be used to supervise the control and switch control laws, if required.

Figure 10:
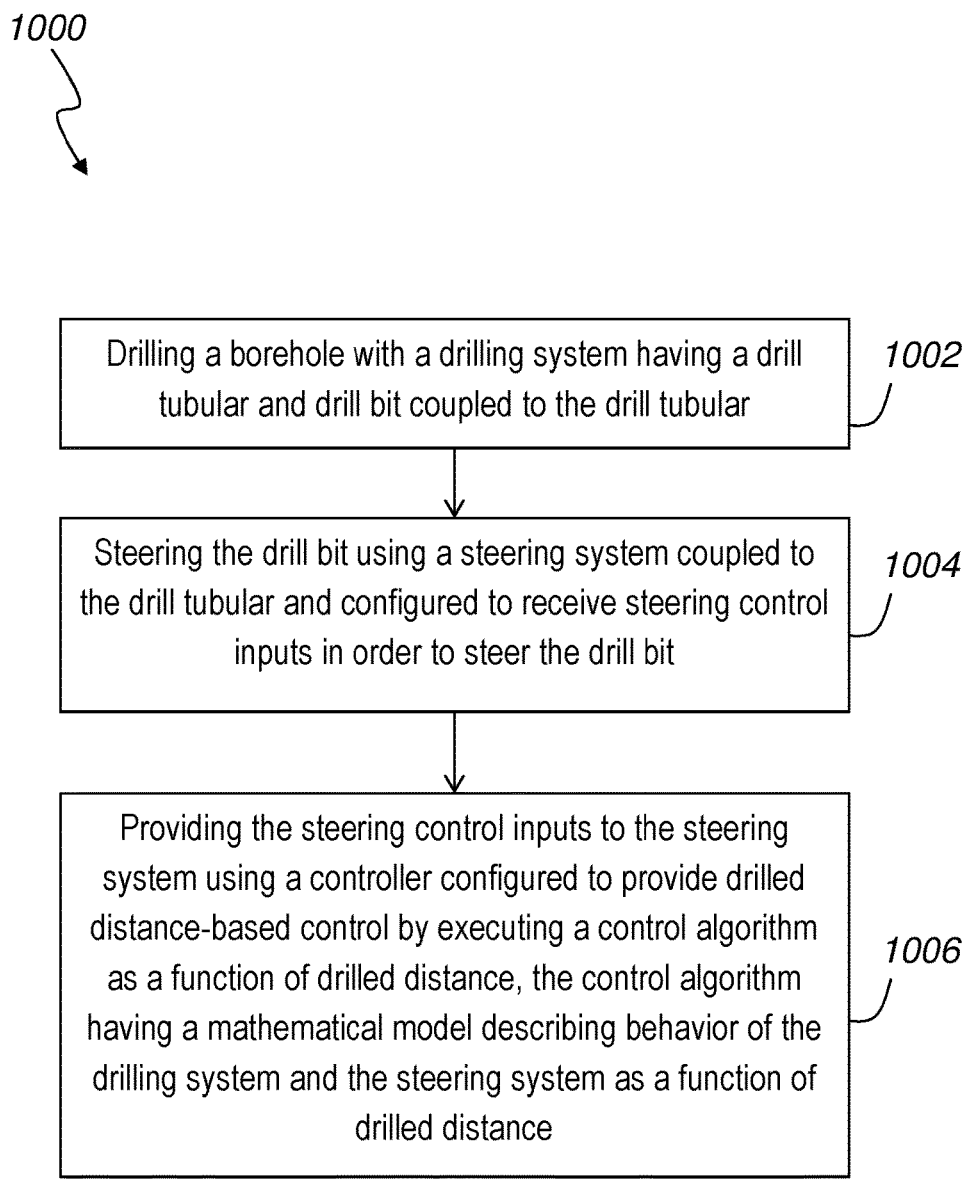
FIG. 10 is a flow chart for a method for controlling a trajectory of a borehole being drilled into the earth.

FIG. 10 is a flow process for one non-limiting example of a process 1000 for controlling a trajectory of a borehole being drilled into the earth. The process 1000 can be performed with drilling systems and/or control systems as shown and described above. Various components may be located on the surface while other components may be located downhole, such as described in various embodiments above. Those of skill in the art will appreciate that the above described embodiments and configurations are not to be limiting, and the process 1000 can be performed by other drilling systems as known in the art.

Block 1002 calls for drilling a borehole with a drilling system having a drill tubular and a disintegrating device coupled to the drill tubular.

Block 1004 calls for steering the disintegrating device using a steering system coupled to the drill tubular and configured to receive steering control outputs/steering system inputs in order to steer the disintegrating device. As noted above, the steering system is inclusive of components that are configured to receive a steering control outputs/steering system inputs and influence the trajectory and/or orientation of the drill tubular and thus the disintegrating device according to the steering control outputs/steering system inputs in order to drill the borehole in a predictable manner. The components may include downhole components such as a rotary steering system and/or surface components such as a top-drive or mud pump.

Block 1006 calls for providing steering control outputs/steering system inputs to the steering system using a control unit configured to provide depth-based control (e.g., as described above). For example, a control algorithm can be employed and provided having a mathematical model describing behavior of the drilling operation (e.g., the steering system) as a function of drilled distance.

The flow process 1000 can also include a step of receiving a position, orientation, inclination, and/or azimuth of a BHA. The BHA is coupled to the drill tubular and can provide feedback signals from the drilling system. For example, sensors disposed on the BHA can detect and/or measure position, orientation, inclination, and/or azimuth of the BHA as sensed data. The sensed data can be sent to the control unit of the drilling system (either on the surface or downhole). In one or more embodiments, the sensors are configured to sense a position of the BHA and the flow process 1000 will further include correcting the position of the BHA to provide a position of the disintegrating device.

The flow process 1000, in some embodiments, can also include controlling an actuator in a steering system to control a trajectory of the borehole being drilled. In one or more embodiments, the actuator is coupled to a pad of a rotary steering system. The pad can contact a wall of the borehole and apply force thereto to steer the disintegrating device in accordance with control signals from the control system.

The flow process 1000, in some embodiments, can also include formation parameter or characteristic information. For example, the flow process 1000 may further include a process of sensing a parameter of a formation using a formation evaluation sensor or tool disposed on the drill tubular. A formation evaluation feedback signal can then be sent from the formation evaluation sensor or tool to the controller or a control unit. The flow process 1000 can further include controlling a drilling trajectory to maintain a distance from, for example, formation cap rocks, formation layers, oil-water contacts, a formation layer, a formation layer boundary, etc. within a selected range of distance, using the formation evaluation feedback signal from the formation evaluation sensors or tools.

The flow process 1000 can also include correcting a received BHA or disintegrating device (e.g., drill bit) position derived from data or a sensor in order to account for bending of the drill tubular in the borehole or stretching/squeezing of the drill tubular due to the force of gravity, pressure differences, temperatures, etc. acting on the drilling assembly and drill tubular.

In support of the teachings herein, various analysis components may be used, including a digital and/or an analog system. For example, the downhole electronics, the computer processing systems, the downhole sensors, the drilling/production parameter controllers, the steering systems, the actuators and/or other components discussed herein may include digital and/or analog systems. Further, the systems and configurations described herein may have components such as processors, storage media, memory, inputs, outputs, communications links (e.g., wired, wireless, pulsed mud, optical, acoustic, electromagnetic, etc.), user interfaces (e.g., display, printer, etc.), software programs, signal processors (e.g., digital, analog) and other such components (e.g., resistors, capacitors, inductors, etc.) to provide for operation and analyses of the apparatus and processes disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present disclosure. These instructions may provide for equipment operation, control, data collection and analysis and other functions deemed relevant by a system designer, owner, user or other such personnel, in addition to the functions described in this disclosure.

Embodiment 1

An apparatus for controlling a trajectory of a borehole being drilled into the earth, the apparatus comprising: a drilling system including a drill tubular, a disintegrating device, and a steering system coupled to the drill tubular configured to steer the drilling system, the drilling system configured to drill the borehole by receiving control outputs from at least one control unit for controlling parameters of the drilling system, the at least one control unit configured to provide the control outputs to the steering system, the at least one control unit being configured to provide depth-based control.

Embodiment 2

The apparatus according to any of the preceding embodiments, wherein the control unit receives and uses data indicative of measured depth to provide the depth-based control.

Embodiment 3

The apparatus according to any of the preceding embodiments, wherein the data indicative of measured depth is generated at the earth's surface or derived from data generated at the earth's surface.

Embodiment 4

The apparatus according to any of the preceding embodiments, wherein the control unit comprises a trajectory control unit configured to control a trajectory of the borehole being drilled and/or an inclination/azimuth control unit configured to control the inclination and/or an azimuth of the borehole being drilled.

Embodiment 5

The apparatus according to any of the preceding embodiments, wherein at least one of the trajectory control unit or the inclination/azimuth control unit is located downhole.

Embodiment 6

The apparatus according to any of the preceding embodiments, further comprising at least one sensor coupled to the drilling system and configured to measure data indicative of a position, orientation, inclination, and/or azimuth of the sensor and provide the measured data to the at least one control unit.

Embodiment 7

The apparatus according to any of the preceding embodiments, wherein the trajectory control unit is configured to provide a control output to the inclination/azimuth control unit and the inclination/azimuth control unit is configured to receive the sensed data indicative of inclination and/or azimuth.

Embodiment 8

The apparatus according to any of the preceding embodiments, further comprising at least one actuator control unit configured to control at least one actuator, the at least one actuator configured to change at least one drilling parameter of the drilling system, the at least one actuator control unit receiving control outputs from the control unit.

Embodiment 9

The apparatus according to any of the preceding embodiments, wherein the actuator is coupled to a pad of a rotary steering system configured to contact a wall of the borehole for steering the drilling system.

Embodiment 10

The apparatus according to any of the preceding embodiments, wherein the actuator is coupled to a bent motor system, the actuator configured to change the bent of the motor.

Embodiment 11

The apparatus according to any of the preceding embodiments, further comprising at least one formation evaluation sensor disposed on the drilling system and configured to sense a parameter of a formation, the formation evaluation sensor configured to provide the sensed parameter to the at least one control unit Embodiment 12

The apparatus according to any of the preceding embodiments, wherein the at least one formation evaluation sensor comprises at least one of a gamma-ray detector, a resistivity sensor, an acoustic sensor, an NMR sensor, or a nuclear sensor.

Embodiment 13

A method for controlling a trajectory of a borehole being drilled into the earth, the method comprising: drilling a borehole with a drilling system comprising a drill tubular and disintegrating device coupled to the drill tubular; and steering the disintegrating device with a steering system coupled to the drill tubular and configured to receive steering control outputs from at least one control unit in order to steer the disintegrating device, the at least one control unit configured to provide depth-based control.

Embodiment 14

The method according to any of the preceding embodiments, wherein the control unit receives and uses data indicative of measured depth to provide the depth-based control.

Embodiment 15

The method according to any of the preceding embodiments, further comprising generating the data indicative of measured depth is generated at the earth's surface or derived from data generated at the earth's surface.

Embodiment 16

The method according to any of the preceding embodiments, further comprising receiving with the at least one control unit data indicative of at least one of a depth, position, orientation, inclination, and/or azimuth of a bottom hole assembly (BHA) coupled to the drill tubular.

Embodiment 17

The method according to any of the preceding embodiments, wherein the at least one control unit comprises a trajectory control unit configured to control a trajectory of the borehole being drilled and/or an inclination/azimuth control unit configured to control the inclination and/or azimuth of the borehole being drilled.

Embodiment 18

The method according to any of the preceding embodiments, further comprising controlling an actuator in the steering system in order to control the trajectory of the borehole being drilled.

Embodiment 19

The method according to any of the preceding embodiments, further comprising (i) sensing a parameter of a formation using a formation evaluation sensor disposed on the drilling system and (ii) providing a signal indicative of a measured output from the formation evaluation sensor to the at least one control unit.

Embodiment 20

The method according to any of the preceding embodiments, further comprising identifying at least one formation feature by using the parameter of a formation and controlling by the at least one control unit the steering system to maintain a distance from the at least one formation feature.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The flow diagrams and schematic diagrams depicted herein are just examples. There may be many variations to these diagrams or the steps (or operations) described therein without departing from the present disclosure. For instance, the steps may be performed in a differing order, or steps may be added, deleted or modified. All of these variations are considered a part of the claims appended herewith.

While one or more embodiments have been shown and described, modifications and substitutions may be made thereto without departing from the present disclosure. Accordingly, it is to be understood that the present disclosure has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the embodiments disclosed and/or variations thereof.

While the present disclosure has been described with reference to non-limiting, example embodiments, it will be understood that various changes may be made and equivalents may be substituted for elements thereof without departing from the scope of the present disclosure. In addition, many modifications will be appreciated to adapt a particular instrument, situation or material to the teachings of the present disclosure without departing from the essential scope thereof. Therefore, it is intended that the claims not be limited to the particular embodiment(s) disclosed as the best mode contemplated for carrying out the concepts herein, but will include all embodiments falling within the scope of the appended claims.

What is claimed is:

1. An apparatus for controlling a trajectory of a borehole being drilled into the earth, the apparatus comprising:
   a drilling system including a drill tubular, a disintegrating device, and a steering system coupled to the drill tubular configured to steer the drilling system,
   the drilling system configured to drill the borehole by receiving control outputs from at least one control unit for controlling parameters of the drilling system,
   the at least one control unit configured to provide the control outputs to the steering system, the at least one control unit being configured to provide a depth-based control output,
   wherein the depth-based control output is calculated at least one of a predetermined drilled distance and a predetermined drilled distance interval, and wherein the depth-based control output is calculated by utilizing an equation that is time independent.

2. The apparatus according to claim 1, wherein the at least one control unit receives and uses data indicative of measured depth to provide the depth-based control output.

3. The apparatus according to claim 2, wherein the data indicative of measured depth is generated at the earth's surface or derived from data generated at the earth's surface.

4. The apparatus according to claim 1, wherein the at least one control unit comprises a trajectory control unit configured to control the trajectory of the borehole being drilled and/or an inclination/azimuth control unit configured to control an inclination and/or an azimuth of the borehole being drilled.

5. The apparatus of claim 4, wherein at least one of the trajectory control unit or the inclination/azimuth control unit is located downhole.

6. The apparatus according to claim 1, wherein the depth-based control output is independent of a rate of penetration.

7. The apparatus according to claim 1, further comprising at least one actuator control unit configured to control at least one actuator, the at least one actuator configured to change at least one drilling parameter of the drilling system, the at least one actuator control unit receiving control outputs from the at least one control unit.

8. The apparatus according to claim 7, wherein the actuator is coupled to a pad of a rotary steering system configured to contact a wall of the borehole for steering the drilling system.

9. The apparatus according to claim 7, wherein the actuator is coupled to a bent motor system, the actuator configured to change a bent of a motor.

10. The apparatus according to claim 1, further comprising at least one formation evaluation sensor disposed on the drilling system and configured to sense a parameter of a formation, the at least one formation evaluation sensor configured to provide the sensed parameter of a formation to the at least one control unit.

11. The apparatus according to claim 10, wherein the at least one formation evaluation sensor comprises at least one of a gamma-ray detector, a resistivity sensor, an acoustic sensor, an NMR sensor, or a nuclear sensor.

12. A method for controlling a trajectory of a borehole being drilled into the earth, the method comprising:
drilling the borehole with a drilling system comprising a drill tubular and disintegrating device coupled to the drill tubular; and
steering the disintegrating device with a steering system coupled to the drill tubular and configured to receive steering control outputs from at least one control unit in order to steer the disintegrating device,
the at least one control unit configured to provide a depth-based control output, wherein the depth-based control output is calculated at least one of a predetermined drilled distance and a predetermined drilled distance interval, and wherein the depth-based control output is calculated by utilizing an equation that is time independent.

13. The method according to claim 12, wherein the at least one control unit receives and uses data indicative of measured depth to provide the depth-based control output.

14. The method according to claim 13, further comprising generating the data indicative of measured depth is generated at the earth's surface or derived from data generated at the earth's surface.

15. The method according to claim 12, wherein the depth-based control output is independent of a rate of penetration.

16. The method according to claim 12, further comprising controlling an actuator in the steering system in order to control the trajectory of the borehole being drilled.

17. The method according to claim 12, further comprising (i) sensing a parameter of a formation using a formation evaluation sensor disposed on the drilling system and (ii) providing a signal indicative of a measured output from the formation evaluation sensor to the at least one control unit.

18. The method according to claim 17, further comprising:
identifying at least one formation feature by using the parameter of a formation; and
controlling, by the at least one control unit, the steering system to maintain a distance from the at least one formation feature.

* * * * *